Oct. 30, 1951 O. T. FRANCIS 2,572,850

PULSE TECHNIQUE CIRCUIT

Filed April 13, 1948

Inventor

Oliver T. Francis

Patented Oct. 30, 1951 2,572,850

UNITED STATES PATENT OFFICE 2,572,850

PULSE TECHNIQUE CIRCUIT

Oliver T. Francis, Renville, Minn.

Application April 13, 1948, Serial No. 20,730

8 Claims. (Cl. 250—27)

This invention relates to voltage magnitude responsive circuits and more particularly to voltage magnitude discriminator circuits used in pulse duration technique.

In pulse duration technique it is common practice to produce a voltage at a transmitting station varying in magnitude with the intelligence to be transmitted, to produce a variable duration or time displaced pulse varying with said magnitude, to transmit said pulse to a receiving station, to produce a voltage at the receiving station varying in magnitude with said time displacement, and to indicate the magnitude of said last voltage. One example of such a system is shown in my U. S. Patent No. 2,399,668, entitled "Impulse Duration Responsive or Indicating Device," issued May 7, 1946. In that patent each voltage magnitude responsive unit consisted of a pentigrid converter tube, together with means for differentially effecting the voltage of two grids of said tube to render it conductive between an upper value and a lower value of input voltage. Such a tube does not have the desired degree of voltage selectivity for certain purposes without additional stages of amplification, and such amplification is accompanied with difficulties, since condenser or transformer coupling are objectionable where a high degree of linear frequency response is required.

It is one of the objects of this invention to provide a voltage magnitude responsive circuit, which by the use of high "mu" tubes shall have any desired degree of selectivity in voltage magnitude response.

Another object is to provide a circuit including a plurality of vacuum tubes having a common load, with means for rendering a first of said tubes conductive only above a higher predetermined input voltage, and a second of said tubes conductive only below a lower value of said input voltage to cause current to be blocked through said load only between said upper and lower values.

Another object is to provide a circuit including a plurality of vacuum tubes having a common load, a first of said tubes being non-conductive below a predetermined value of input voltage, a second of said tubes being non-conductive above a second predetermined value of said input voltage, and a third of said tubes being non-conductive in response to a change in direction of said input voltage to cause current to be substantially blocked through said load only at the instant of said change. Another object is to provide a means for causing said input voltage to vary with the duration or time displacement of a pulse to be determined.

Multivibrator, (or flip-flop) circuits have been used in duration pulse technique. Such circuits consume considerable power, and have undesirable selectivity variations with variations of "B" battery supply. It is an object of this invention to provide a circuit having low current consumption and where the circuit response shall be changed a minimum by deleterious "B" battery fluctuations, and where the heating elements of the vacuum tubes comprising the voltage selective units may be heated by a common "A" battery or heater supply.

These and other objects will become apparent from the following description and claims, wherein:

Figure 1:
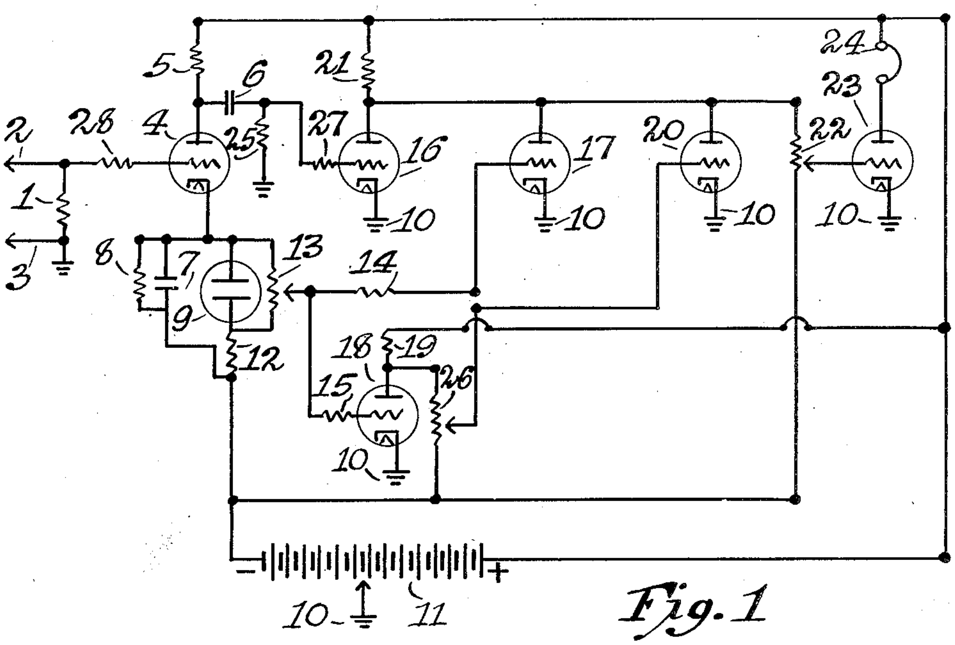
Fig. 1 shows a diagrammatic embodiment of my invention.
Figure 2:
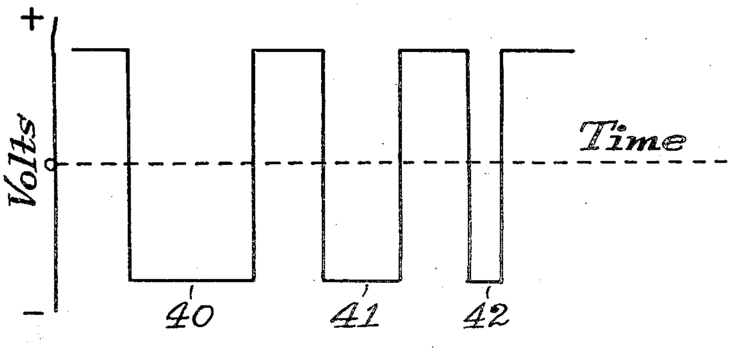
Fig. 2 shows a plurality of pulses to which my invention is selectively responsive.

Referring to Fig. 1, negative signal pulses having different durations, such as shown at 40, 41, and 42 of Fig. 2, may be impressed by lines 2 and 3, across resistance 1, one terminal of which is connected to ground 10, and the other terminal connected to the grid of vacuum tube 4 through resistance 28. In the output circuit of tube 4 is connected source of voltage 11 and a small resistance 5 (5000 ohms for example). In the common input output circuit of tube 4 is connected condenser 7 in parallel with resistance 8. In parallel with resistance 8 is connected gas discharge device 9 and resistance 12. In parallel with device 9 is connected potentiometer 13.

The grids of vacuum tubes 17 and 18 are connected to an intermediate point on potentiometer 13 through resistance 14 and 15, respectively. The output circuit of vacuum tube 17 includes source of voltage 11, resistance 21. This later resistance is also common to the output circuits of vacuum tubes 16, 20. The grid of vacuum tube 16 is connected to the plate of vacuum tube 4 through resistance 27 and condenser 6 and through resistance 25 to ground 10. The output circuit of tube 18 includes source of voltage 11 and resistance 19. The anode of tube 18 is connected to the negative terminal of battery 11 through potentiometer 26. The grid of tube 20 is connected to an intermediate point on potentiometer 26 to cause the voltage applied to the grids of tubes 17 and 20 to vary differentially as the voltage across condenser 7 is varied. The common anode connection of tubes 16, 17, and 20 is connected to the negative terminal of battery 11 through potentiometer 22, an intermediate point of which is connected to the grid of vacuum tube 23. In the output circuit of tube 23 is connected electro-responsive device 24 and source of voltage 11. It will be noted that the cathodes of all the vacuum tubes (except tube 4) are connected to ground and therefore may be heated by one source of "A" supply.

In operation signal patterns consisting of negative pulses having different durations are applied to the grid of vacuum tube 4 through resistance 28 from lines 2 and 3, blocking space current through vacuum tube 4, permitting condenser 7 to discharge through resistance 8. If the duration of this negative pulse (41 of Fig. 2) is such as to permit condenser 7 to discharge to the point where the grids of tubes 17, 18 assume only a slightly negative potential the voltage drop across resistance 19 is not sufficient to impress a positive charge on the grid of vacuum tube 20 through potentiometer 26. At the end of negative pulse 41, the grid of vacuum tube 4 goes positive causing its anode to go negative and a brief negative impulse is impressed on the grid of vacuum tube 16 blocking space current therein. The duration of this impulse is dependent on the RC time element of resistance 25, condenser 6. Under this condition space current is substantially blocked in vacuum tubes 16, 17, and 20, all their grids being negative. A positive potential is impressed on the grid of tube 23 and current flows through electro-responsive device 24.

If the pulse applied to the grid of tube 4 is of longer duration such as shown at 40 of Fig. 2, condenser 7 discharges to the point where current is completely blocked through resistance 19, impressing a positive charge on the grid of tube 20 through potentiometer 26. At the end of pulse 40, tubes 16, 17 are blocked but tube 20 is conductive, the grid of tube 23 remaining negative and no response appears in device 24.

If a pulse of short duration such as 42 of Fig. 2 is applied to the grid of tube 4, condenser 7 has not discharged sufficiently at its end to cause the grid of tube 17 to go negative. Tubes 16 and 20 are blocked, but tube 17 is highly conductive. The grid of tube 23 remains negative with no response in device 24.

It is therefore apparent that I have illustrated a device which is responsive to a pulse of one duration only, and that the duration of said pulse to which said device will respond is dependent on the point on potentiometer 13 to which the grids of tubes 17, 18 connect. I have "tuned in" as many as twenty different duration pulses by varying potentiometer 13, by a circuit, the constants of which are given hereinafter. One of the major novel features of my invention relates to the voltage magnitude discrimination of tubes 17, 20, whose grids are differentially effected as the voltage across condenser 7 is varied, to block space current through resistance 21 for one input voltage only (or over a desired width of voltage depending on the setting of potentiometer 26). Since all of the tubes shown (except tube 4) are chosen to have a high mu, the current abruptly rises and falls through resistance 21. The current change in device 24 is even more abrupt, by reason of the amplification factor of tube 23.

To further illustrate the functioning of my invention one set of circuit constants used in one experiment is described below. It will be understood that my invention is not limited to the circuit constants given or to constants of the same order, the invention being described in the appended claims.

In one experimental circuit tubes 16, 17, 18, 20 were 2A6. Tube 4 was a 2A5 connected as a triode. Tube 23 was a 27. Gas discharge device 9 was a UX874. Condenser 7 was .02 mf. Condenser 6 a .000250 mf. Resistance 1, a half megohm. Resistances 14, 15, 27, 28, ten megohms each. Resistance 5 was 5000 ohms. Resistances 12, 21, 25, a quarter megohm each. Resistance 8 was 150,000 ohms. Potentiometer 13, one megohm. Potentiometers 22, 26, ten megohms connected at center tap. Electro-responsive device 24, an old loud speaker. Positive battery 11 was plus 200 volts, negative battery, minus 120 volts. As stated above as many as twenty different duration pulses could be tuned in, the signal pattern being repeated at 100 cycles per second.

The two triode sections of a 6SC7 were substituted for tubes 17, 20 with equally good results. The twin triode 6SC7 includes a plurality of anodes and control electrodes with a single cathode in the same envelope, and thereby reduces the number of tubes used in the circuit. Some of the claims recite "a plurality of vacuum tubes having an anode, a cathode and a control electrode." It will be understood that incorporation of a plurality of anodes and grids with a single cathode in an evacuated container (the 6SC7 for example) come within the meaning of these claims.

It is apparent that my invention may take widely different forms without departing from its spirit and it is to be limited in scope only as defined in the following claims.

What I claim is:

1. In a voltage magnitude indicating circuit, a plurality of vacuum tubes having input and output circuits, a load common to the output circuit of all of said tubes, a source of variable voltage, means for applying said variable voltage to the input circuit of a first of said tubes to block space current therein below a predetermined magnitude of said voltage, means for reversing the phase of said variable voltage, means for applying the voltage of reverse phase to the input circuit of a second of said tubes to render a second of said tubes conductive to space current below said predetermined magnitude, means for producing a pulse by a change of direction of said variable voltage, means for applying said pulse to the input circuit of a third of said tubes to render it non-conductive to space current at the instant of said change, and means for indicating a decrease in current through said load.

2. In a duration indicating device, means for producing a voltage having a magnitude determined by the duration of a pulse to be indicated, a device responsive only at said magnitude, comprising: a plurality of vacuum tubes having a common output circuit and separate input circuits, a load connected in said common output circuit, indicating means responsive to a decrease in current through said load, means for applying said voltage to the input circuit of a first of said tubes to render it non-conductive below said magnitude, means for producing a second voltage of reverse phase, means for applying said second voltage to the input circuit of a second of said tubes to render it non-conductive above said magnitude, and means for rendering said indicating means operable only at the end of said duration.

3. In a voltage magnitude indicating circuit, a plurality of vacuum tubes having input and output circuits, a load common to the output circuit of all of said tubes, a source of variable voltage, means for applying said variable voltage to the input circuit of a first of said tubes to block space current therein below a predetermined magnitude of said voltage, means for reversing the phase of said variable voltage, means for applying the voltage of reversed phase to the input circuit of a second of said tubes to render a second of said tubes conductive to space current below said predetermined magnitude, means for producing a pulse by a change of direction of said variable voltage, means for applying said pulse to the input circuit of a third of said tubes to render it non-conductive to space current at the instant of said change, and means for indicating a decrease in said current through said load, said source of variable voltage comprising a thermionic valve having an input and an output circuit, a condenser in parallel with a resistance connected in the common input output circuit of said valve, and means for applying a signal voltage to said input circuit of said valve to permit said condenser to discharge through said resistance.

4. In a voltage magnitude indicating circuit according to claim 1, wherein said means for applying said variable voltage to the input circuit of a first of said tubes comprises a constant voltage device and a resistance connected in series across said source of variable voltage, a voltage divider connected across said device, and means for applying a portion of the voltage across said divider to said input circuit of said first of said tubes.

5. In a voltage magnitude indicating circuit according to claim 1, wherein said means for producing a pulse comprises a vacuum tube valve having an input and an output circuit, a condenser in parallel with a resistance connected in the common input output circuit of said valve, a load resistance connected in said output circuit of said valve, and means for applying a signal voltage to said input circuit of said valve.

6. In a duration indicating device according to claim 2 wherein said means for producing a voltage having a magnitude determined by the duration of a pulse comprises a thermionic valve having an input and an output circuit, a resistance in parallel with a condenser connected in the common input output circuit of said valve, and means for applying said pulse to said input circuit of said valve to permit said condenser to discharge through said resistance for said duration.

7. In a duration indicating device according to claim 2 wherein said means for applying said voltage to the input circuit of a first of said tubes comprises a gas discharge device and a resistance connected in series across said means for producing a voltage having a magnitude determined by the duration of a pulse, a potentiometer connected across said gas discharge device, and means for applying a portion of the voltage across said potentiometer to said input circuit of a first of said tubes.

8. In a duration indicating device according to claim 2, wherein said last means comprises a third of said vacuum tubes, means for producing a negative impulse at the end of said duration, and means for applying said impulse to the input circuit of said third of said tubes, to render the output circuit of said third tube non-conductive at said end of said duration.

OLIVER T. FRANCIS.

REFERENCES CITED

The following references are of record in the file of this patent:

UNITED STATES PATENTS

| Number | Name | Date |
|---|---|---|
| 2,199,634 | Koch | May 7, 1940 |
| 2,399,668 | Francis | May 7, 1946 |
| 2,434,937 | Labin | Jan. 27, 1948 |
| 2,449,848 | Hefele | Sept. 21, 1948 |
| 2,493,648 | Watton et al. | Jan. 3, 1950 |